(12) United States Patent
Takayama et al.

(10) Patent No.: US 9,163,939 B2
(45) Date of Patent: Oct. 20, 2015

(54) METHOD OF MANUFACTURING THERMALLY-ASSISTED MAGNETIC HEAD AND ALIGNMENT APPARATUS THEREOF

(71) Applicant: SAE Magnetics (H.K.) Ltd., Hong Kong (CN)

(72) Inventors: Seiichi Takayama, Hong Kong (CN); Ryuji Fujii, Hong Kong (CN); Takashi Honda, Hong Kong (CN); Osamu Harakawa, Hong Kong (CN); Tadatoshi Koba, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 14/193,337

(22) Filed: Feb. 28, 2014

(65) Prior Publication Data

US 2015/0247722 A1    Sep. 3, 2015

(51) Int. Cl.

| | |
|---|---|
| *G11B 5/127* | (2006.01) |
| *G01B 11/27* | (2006.01) |
| *G11B 5/00* | (2006.01) |
| *G11B 13/08* | (2006.01) |
| *G11B 5/60* | (2006.01) |
| *G11B 9/12* | (2006.01) |
| *G11B 5/48* | (2006.01) |

(52) U.S. Cl.
CPC .............. *G01B 11/272* (2013.01); *G11B 5/127* (2013.01); *G11B 5/1272* (2013.01); *G11B 5/4866* (2013.01); *G11B 5/6088* (2013.01); *G11B 9/12* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,393,074 B1 | 3/2013 | Takayama et al. | |
| 2006/0233061 A1* | 10/2006 | Rausch et al. | 369/13.32 |
| 2011/0228650 A1 | 9/2011 | Shimazawa et al. | |

* cited by examiner

*Primary Examiner* — Wayne Young
*Assistant Examiner* — Brian Butcher
(74) *Attorney, Agent, or Firm* — Nixon & Vanderhye, P.C.

(57) ABSTRACT

A method of manufacturing a thermally-assisted magnetic head includes providing a light source unit including a laser diode; providing a reflection board, and a photo detector; driving the laser diode to emit a light beam towards the reflection board; performing an alignment between the light source unit and the thermally-assisted magnetic recording head section, based on a reflected light of the light beam reflected by the reflection board, then passed through the optical waveguide and finally detected by the photo detector obtaining the maximum power in a LED emission state of the laser diode; and bonding the light source unit to the slider after the alignment is completed. It improves alignment accuracy between a light source unit and a slider during a bonding process therebetween, prevents a laser diode of the light source unit instability, and improves performance of the thermally-assisted magnetic head finally.

10 Claims, 11 Drawing Sheets 340  801

METHOD OF MANUFACTURING THERMALLY-ASSISTED MAGNETIC HEAD AND ALIGNMENT APPARATUS THEREOF

FIELD OF THE INVENTION

The present invention relates to a method of manufacturing a thermally-assisted magnetic recording head used in a thermally-assisted magnetic recording in which near-field light is applied to a magnetic recording medium to lower a coercivity thereof so as to record information, and an alignment apparatus used therefor.

BACKGROUND OF THE INVENTION

With recent improvements in recording density of magnetic recording devices such as magnetic disk drives, there has been a demand for improving the performance of magnetic heads and magnetic recording media. In a magnetic disk drive, a magnetic head is mounted on a slider that flies slightly above the surface of a magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with light. The light for use to generate near-field light is typically guided through a waveguide, which is provided in the slider, to the plasmon generator disposed near the medium facing surface, that is, a surface of the slider that faces the magnetic recording medium.

To supply the light for use to generate near-field light to the waveguide, a laser diode may be secured to the slider to allow laser light emitted from the laser diode to be incident on the incidence end of the waveguide provided in the slider, as disclosed in U.S. Patent Application Publication No. 2011/0228650 A1, for example.

U.S. Patent Application Publication No. 2011/0228650 A1 discloses a thermally-assisted magnetic recording head including a slider having a waveguide, and a light source unit. The light source unit includes a laser diode and a supporting member for supporting the laser diode. The supporting member is bonded to the slider, being positioned so that emitted light from the laser diode will be incident on the incidence end of the waveguide. Solder, for example, is used to bond the supporting member to the slider.

In the process of manufacturing the thermally-assisted magnetic recording head including the laser diode, the supporting member and the slider as described above, it is important that the supporting member be accurately positioned with respect to the slider and secured thereto so that emitted light from the laser diode will be accurately incident on the incidence end of the waveguide.

U.S. Patent Application Publication No. 2011/0228650 A1 discloses a positioning and securing method that allows the supporting member to be positioned with respect to the slider and secured thereto in the following manner. In the positioning and securing method, emitted light from the laser diode is allowed to be incident on the incidence end of the waveguide, the intensity of light emitted from the emitting end of the waveguide is detected, and the supporting member is positioned with respect to the slider so that the aforementioned intensity becomes maximum. Subsequently, the supporting member is irradiated with heating laser light that is projected to pass through the supporting member, so that the solder interposed between the slider and the supporting member is heated and melted by the heating laser light. After that, the irradiation with the heating laser light is stopped to solidify the solder to thereby allow the supporting member to be secured to the slider.

In the method of performing thermally-assisted magnetic recording with use of a plasmon generator, it is important to stably supply light with sufficient intensity to a desired position on the magnetic recording medium. Therefore, it is necessary to secure high alignment accuracy for fixing a light source unit to a slider. Reduction in alignment accuracy causes reduction in heating efficiency with respect to a magnetic recording medium, and it is serious issue in thermally-assisted magnetic recording.

From the reason, it is desirable to provide a method capable of easily and accurately manufacturing a thermally-assisted magnetic recording head excellent in write efficiency. Moreover, it is also desirable to provide an alignment apparatus suitable for such a method of manufacturing a thermally-assisted magnetic recording head.

SUMMARY OF THE INVENTION

One objective of the present invention is to provide a method of manufacturing a thermall-assisted magnetic head, thereby improving alignment accuracy between a light source unit and a slider during a bonding process therebetween, preventing a laser diode of the light source unit instability, and improving performance of the thermally-assisted magnetic head finally.

Another objective of the present invention is to provide an alignment apparatus allowing a light source unit to be aligned with a slider during a bonding process, thereby improving alignment accuracy therebetween, preventing a laser diode of the light source unit instability, and improving performance of the thermally-assisted magnetic head finally.

To achieve above objectives, a method of manufacturing a thermally-assisted magnetic head includes:

providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide;

providing a light source unit including a laser diode disposed at the back side of the slider;

providing a reflection board at the front of the laser diode and the slider, and a photo detector at the back of the laser diode;

driving the laser diode to emit a light beam towards the reflection board;

performing an alignment between the light source unit and the thermally-assisted magnetic recording head section, based on a reflected light of the light beam reflected by the reflection board, then passed through the optical waveguide and finally detected by the photo detector obtaining the maximum power in a LED emission state of the laser diode;

bonding the light source unit to the slider after the alignment is completed.

As a preferred embodiment, after the alignment is completed, the method further comprises judging performance of the plasmon generator by analyzing the maximum power of the reflected light.

Preferably, the reflection board is a disk or a reflector that has the same reflectivity of the disk.

Optionally, the photo detector is embedded in a supporting member of the light source unit Optionally, the photo detector is separated from a supporting member of the light source unit.

Preferably, further includes providing a lens fiber at the back of the laser diode and connected with the photo detector.

Accordingly, an alignment apparatus using in the manufacturing method includes a reflection board at the front of the laser diode and the slider; a driver driving the laser diode to emit a light beam towards the reflection board; a photo detector at the back of the laser diode, for detecting a power of a reflected light of the light beam reflected by the reflection board; and a controller controlling a relative-position relationship between the light source unit and the slider, based on the reflected light obtaining the maximum power in a LED emission state of the laser diode.

Preferably, it further includes a judgment module for judging performance of the plasmon generator by analyzing the maximum power of the reflected light.

Preferably, the reflection board is a disk or a reflector that has the same reflectivity of the disk.

Optionally, the photo detector is embedded in a supporting member of the light source unit Optionally, the photo detector is separated from a supporting member of the light source unit.

Preferably, further includes providing a lens fiber at the back of the laser diode and connected with the photo detector.

In comparison with the prior art, as the manufacturing method of the present invention provides a reflection board at the front of the laser diode and the slider, and a photo detector at the back of the laser diode, and drives the laser diode to emit a light beam towards the reflection board, and performing the alignment process, based on a reflected light of the light beam reflected by the reflection board, then passed through the waveguide and finally detected by the photo detector obtaining the maximum power in the LED emission state of the laser diode. Since a stable performance of the laser diode can be obtained in the LED emission state, thus the alignment process is performed in this LED emission state can achieve a more stable effect and improve the alignment accuracy therefore.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
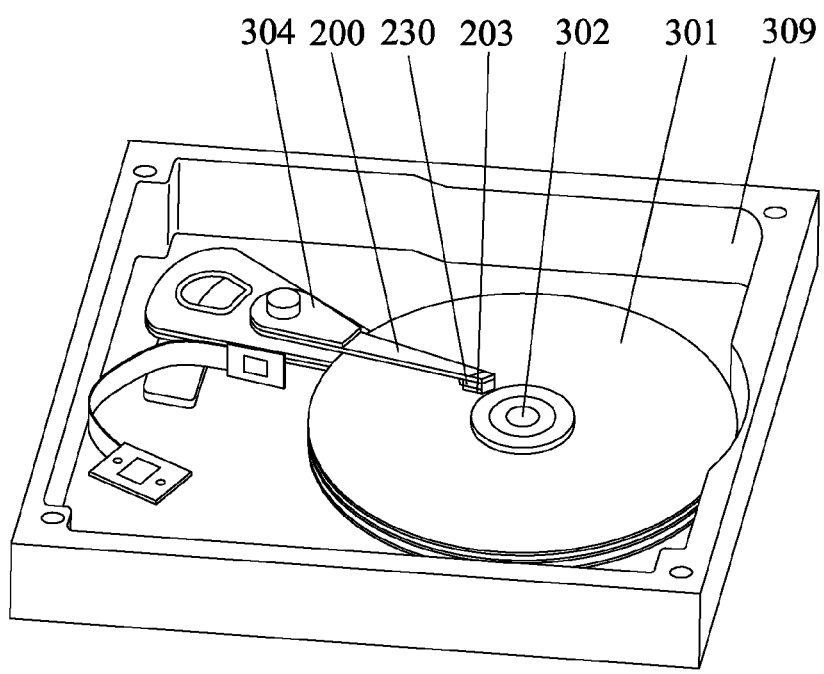
FIG. 1 is a perspective view of an HDD according to an embodiment of the invention.

Various preferred embodiments of the invention will now be described with reference to the figures, wherein like reference numerals designate similar parts throughout the various views. As indicated above, the invention is directed to a method of manufacturing a thermally-assisted magnetic head and an alignment apparatus using therein, thereby improving alignment accuracy between a light source unit and a slider during a bonding process therebetween, preventing a laser diode of the light source unit instability, and improving performance of the thermally-assisted magnetic head finally.

Figure 2:
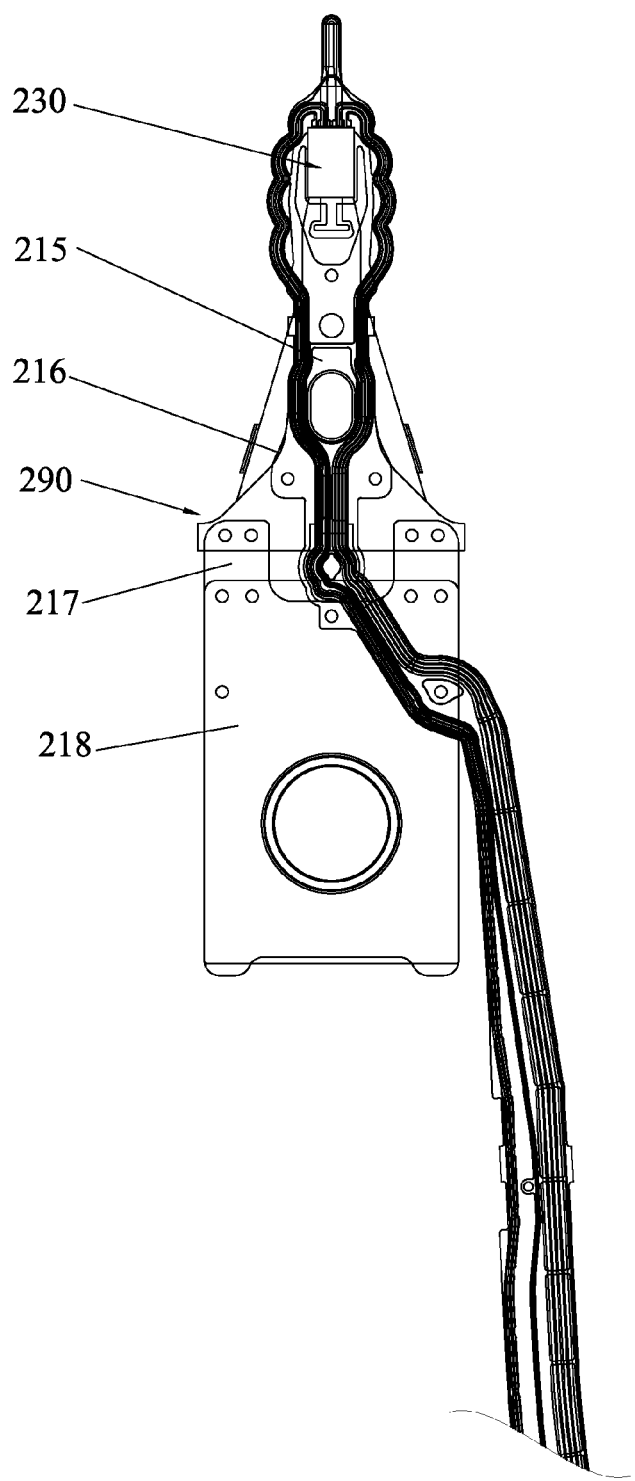
FIG. 2 is a perspective view of an HGA of the HDD shown in FIG. 1.

FIG. 1 is a perspective view of an HDD according to an embodiment of the present invention. The HDD 300 includes several HAAs having multiple HGAs 200 and drive arms 304 stacked and connected to the HGAs 200, a series of rotatable disks 301, and a spindle motor 302 to spin the disk 301, all of which are mounted in a housing 309. The structure of the HDD 300 according to the present invention is not limited to that described above. For example, the number of the rotatable disks 301, HGAs 200 and drive arms 304 may be one. As shown in FIG. 2, each HGA 200 includes a suspension 290 and a thermally-assisted magnetic head slider 230 carried on the suspension 290 which has a thermally-assisted magnetic head as a thin-film magnetic head for reading from and writing into the rotatable disks 301. The suspension 290 includes a load beam 216, a base plate 218, a hinge 217 and the flexure 215, all of which are assembled with each other. Specifically, the thermally-assisted head slider 230 is carried on the flexure 215.

Figure 3:
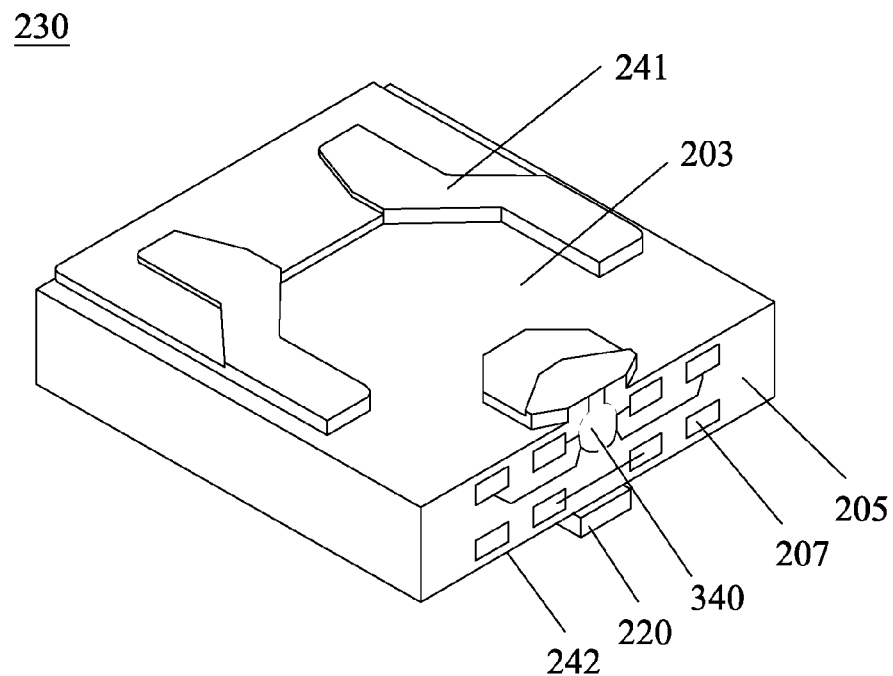
FIG. 3 is a perspective view of a thermally-assisted magnetic head slider with a thermally-assisted magnetic head section according to an embodiment of the present invention.

As shown in FIG. 3, the thermally-assisted magnetic head slider 230 includes a substrate 203, a thermally-assisted magnetic read write head 340 embedded in the substrate 203 for reading and writing. The substrate 203 may be substantially formed as a hexahedron, for example, and one surface thereof corresponds to an ABS 241 that is disposed in proximity to and to face the recording surface of the magnetic disk 301. When the disk 301 is rotated at a high speed, the slider 230 will move above the front surface of the magnetic disk 301 to be in a load state. The high-speed rotation of the magnetic disk 301 causes an air flow between the recording surface and the ABS 241, and the resulting lift force leads to a state where the slider 230 floats to maintain a certain distance (magnetic spacing) in a direction orthogonal to the recording surface.

Concretely, referring to FIG. 3 again, the substrate 203 includes a leading edge (not shown), a trailing edge 205, an ABS 241 facing to the disk and processed so as to provide an appropriate flying height, an opposing surface 242 opposite the ABS 241, and a thermally-assisted magnetic read write head 340 embedded in the trailing edge 205. The trailing edge 205 has multiple bonding pads 207, such as eight, to couple with a suspension 290 of the HGA 200. Specifically, the light source unit 220 is mounted on the opposing surface 242. In this embodiment, the light source unit 220 is a laser diode module which will be described below.

Concretely, thermally-assisted magnetic head 340 includes a magnetoresistive (MR) read head section (not shown) formed on the substrate 203 and a write head section 342 formed on the MR read head. For example, the MR read head can be Current Perpendicular to Plane (CPP) sensor, Current In Plane (CIP) sensor, tunnel magnetoresistive (TMR) sensor, giant magnetoresistive (GMR) sensor, or anisotropic magnetoresistive (AMR) sensor and the like.

Figure 4:
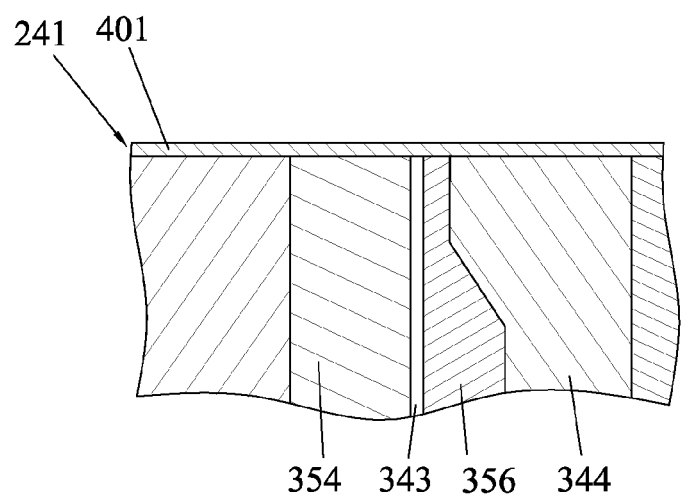
FIG. 4 is a cross-section view of the thermally-assisted magnetic write head section of FIG. 3.

FIG. 4 is an enlarged sectional view of the thermally-assisted magnetic write head section 342 of the thermally-assisted magnetic read write head 340 according to an embodiment. Specifically, the thermally-assisted magnetic write head section 342 includes a magnetic pole 344 in which several coils (not shown) are sandwiched, a waveguide 354 formed adjacent to the magnetic pole 344 for guiding light generated by the light source unit 220, and a plasmon generator 356 sandwiched between the magnetic pole 344 and the waveguide 354 for propagating near-field light to the ABS 241. And a gap 343 is formed between the waveguide 354 and the plasmon generator 356. The waveguide 354 is formed by a dielectric material that allows laser light to pass therethrough. And a cover layer 251 is covered to form the ABS 241.

The waveguide 354 is made of a dielectric material allowing a laser beam to pass therethrough. Examples of the constituent material of the waveguide 354 include SiC, DLC, TiOx (titanium oxide), TaOx (tantalum oxide), SiNx (silicon nitride), SiOxNy (silicon oxynitride), Si (silicon), ZnSe (zinc selenide), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond).

Concretely, the forward end of the plasmon generator 356 has a near-field light generating surface facing to the ABS 241. The plasmon generator 356 is made of nonmagnetic materials including Au, Ag, Cu, Al, Ti, Ta or Ge element, or alloy thereof such as, which has high light absorption characteristic and low light refraction index, and its thickness is in a range of 10 nm~100 nm. Commonly, the plasmon generator 356 can be a plasmon antenna.

The plasmon generator 356 generates the near-field light NF from the ABS 241, based on the laser light which has propagated through the waveguide 354. The magnetic pole 344 stores therein magnetic flux generated in coils, and releases the magnetic flux from the ABS 241 to thereby generate a write magnetic field for writing magnetic information into the magnetic disk 301.

When writing data, signal current is conducted through the coils and flux is induced into the magnetic poles 344, which causes flux to fringe across the pole tips at the ABS 241. This flux magnetizes circular tracks on the rotating disk 301 during a write operation. Meanwhile, laser light is generated from the light source unit 220, for example the laser diode, and propagated through the waveguide 354 and guided to the plasmon generator 356. Then, the near-field generating surface of the plasmon generator 356 will generate near-field light which may be propagated to the ABS 241. The generated near-field light reaches the surface of the magnetic disk 301, and heat a portion of the magnetic recording layer of the magnetic disk 301. As a result, the coercive force of the portion is decreased to a value that facilitates writing; thus the thermally-assisted magnetic recording can be accomplished successfully.

Figure 5:
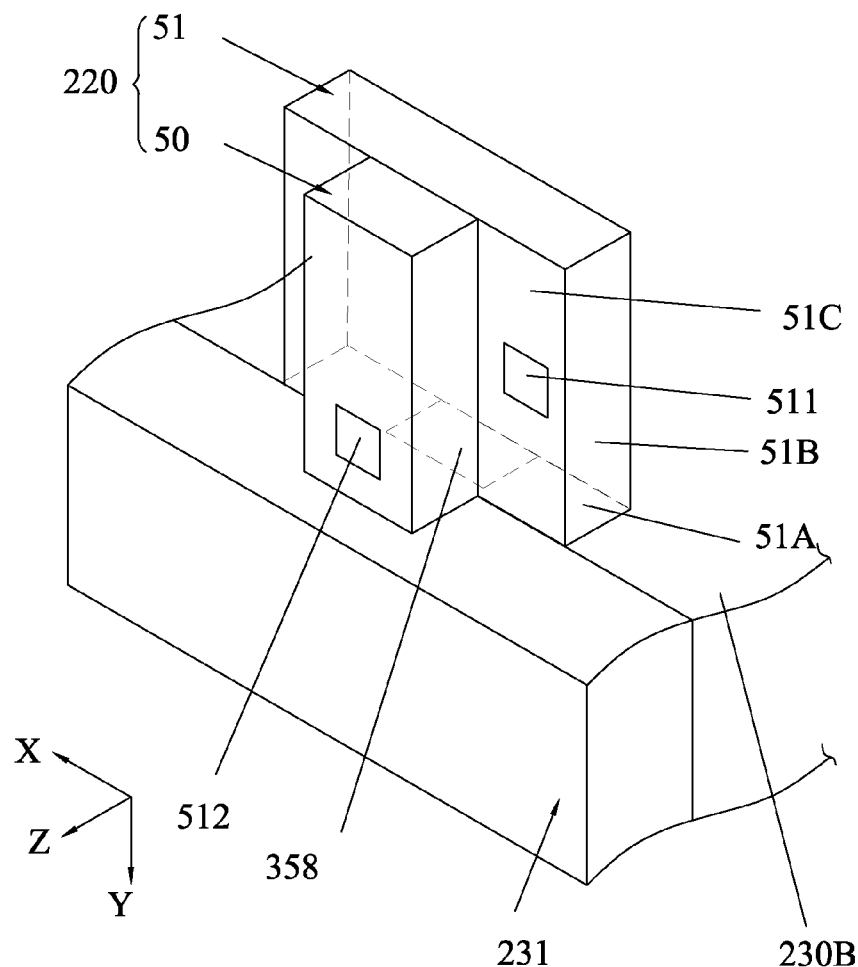
FIG. 5 is a perspective view illustrating a general configuration of a whole light source unit of the thermally-assisted magnetic head slider.

The light source unit 220 provided at the back side of the magnetic head slider body 231 includes a laser diode 50 as a light source emitting a laser beam, and a rectangular-solid supporting member 51 supporting the laser diode 50, as illustrated in FIG. 5. Incidentally, FIG. 5 is a perspective view illustrating a general configuration of the whole light source unit 220.

The supporting member 51 is formed of, for example, a ceramic material such as $Al_2O_3$.TiC. As illustrated in FIG. 5, the supporting member 51 includes a bonding surface 51A to be adhered to a back surface 230B of the slider 230, and a light source mounting surface 51C orthogonal to the bonding surface 51A. The laser diode 50 is mounted on the light source mounting surface 51C. And the supporting member 51 includes two side surfaces 51B. The supporting member 51 desirably has a function of a heatsink dissipating heat generated by the laser diode 50, in addition to the function to support the laser diode 50.

Laser diodes generally used for communication, for optical disc storage, or for material analysis, for example, InP-based, GaAs-based, or GaN-based laser diodes, may be used as the laser diode 50. The wavelength of the laser beam emitted from the laser diode 50 may be any value within the range of, for example, 395 nm to 1.7 μm. Specifically, examples of such a laser diode include a laser diode of InGaAsP/InP quaternary mixed crystal with the emission wavelength region of 1.2 to 1.6 μm. The relative positions of the light source unit 220 and the magnetic write head section 342 are fixed by adhering the bonding surface 51A of the supporting member 51 to the back surface 230B of the slider 230 so that the emission center and the rear end surface of the waveguide 354 are coincident with each other. The thickness of the laser diode 50 is, for example, within a range of about 60 to 200 μm. A predetermined voltage is applied between the electrodes 511, 512 so that a laser beam is emitted. The laser diode 50 may be driven with use of a power source in the magnetic disk device. The magnetic disk device generally includes a power source generating a voltage of about 2 V, for example, and the voltage generated by the power source is sufficient to drive the laser diode 50. In addition, the laser diode 50 consumes power of about several tens mW, which may be sufficiently covered by the power source in the magnetic disk device.

Figure 6:
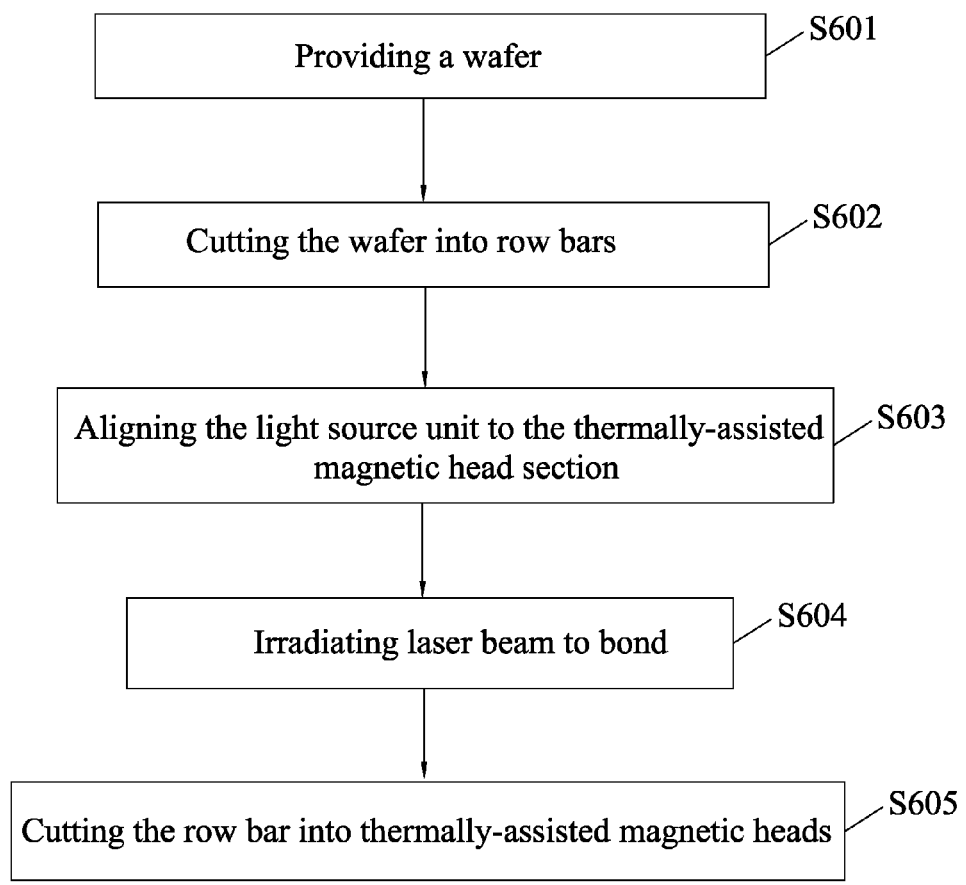
FIG. 6 is a simplified flowchart of a method of manufacturing a thermally-assisted magnetic head according to one embodiment of the present invention.

Now a method of manufacturing thermally-assisted magnetic head will be described. Referring to FIG. 6, the simplified flowchart of the method of manufacturing magnetic head device is shown. FIG. 7 to FIG. 9 and FIG. 11 are perspective views depicting main steps in the method of manufacturing the thermally-assisted magnetic head as mentioned in FIG. 6, respectively, and detailed descriptions of other steps mentioned in FIG. 6 are conventional and omitted here therefore. In addition to that, an alignment device will also be described.

The method includes several main steps as following:

S601, providing a wafer;

S602, cutting the wafer into row bars;

S603, aligning the light source unit to the thermally-assisted magnetic head section;

S604, irradiating laser beam to bond them together;

S605, cutting the row bar into individual sliders.

Figure 7:
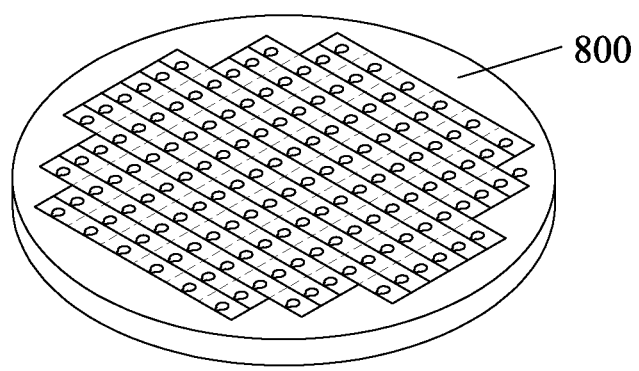
FIG. 7 is a perspective view illustrating a process in a method of manufacturing the magnetic head shown in FIG. 6.

As shown in FIG. 7, a wafer 800 configured of, for example, AlTiC is first prepared. The wafer 800 eventually becomes a plurality of sliders. Subsequently, a plurality of magnetic reading/recording head sections 340 are formed in an array on the wafer 800 by using conventional procedures which are well known to person ordinarily skilled in the art and omitted therefore.

Figure 8:
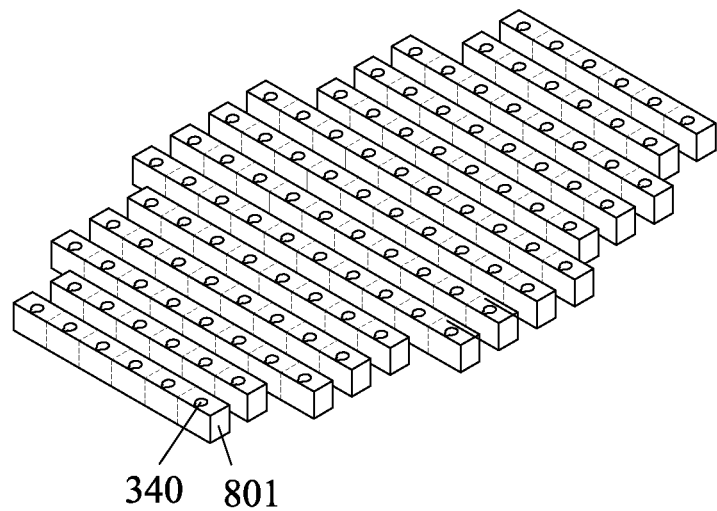
FIG. 8 is a perspective view illustrating a process following the process of FIG. 7.

The wafer 800 is cut to form a plurality of row bars 801 as shown in FIG. 8. On the row bars 801, a plurality of magnetic head sections 340 are formed in a line. Further, mechanical polishing is performed on one end face of the bar 801 followed by selective etching using the photolithographic technique or the like to form the ABS 241.

Subsequently, the light source units 220 are prepared to bond them at each predetermined position on the row bars 801 following the procedures given below (referring to FIG. 9). The alignment apparatus includes a probe 91, a tray (not shown), a photo detector 93, a controller 94, a driver 95, and a reflection board 96. The probe 91 is a hold section holding the light source unit 220, and the tray is mounted with the bar 801 which is divided into the plurality of sliders 230 later. The driver 95 drives the laser diode 50 to control output thereof The driver 95 controls the drive current to be supplied to the laser diode 50 to perform in a LED emission state and emit a light beam towards the reflection board 96. The controller 94 functions to allow the relative position between the light source unit 220 held by the probe 91 and the bar 801 mounted on the tray to be moved. Concretely, the controller 94 includes a monitor 941 connected to the photo detector 93. The reflection board 96 is positioned at the front of the laser diode 50 and the slider 230, that is, the reflection board 96 is positioned at the side of the ABS. The photo detector 93 is positioned at the back of the laser diode 50 opposite to the reflection board 96, for detecting powers of a reflected light of the light beam reflected by the reflection board 96.

Specifically, in the first place, a bonding layer 358 is formed using, for example, a vapor deposition technique at a predetermined position on a rear surface 801B of the row bar 801 that is eventually used as a rear surface of the slider body 231. The bonding layer 358 is used for bonding the light source units 220 to the slider body 231. The bonding layer 358 is formed of, for example, solder, i.e., Sn (tin) element, or alloy containing Sn, Pb (lead), or Bi (bismuth). More specifically, it can be an alloy containing SnAu, SnCu, SnAl, SnSi, SnGe, SnMg, SnPb, SnAg, SnZn, SnBi, SnNi, SnPt, PbAu, PbMg, PbBi, BiAu, and others. Incidentally, the bonding layer 358 may be provided on the junction surface 51A of a supporting member 51 in opposition to the rear surface 230B.

Next, the row bar 801 is placed on the tray of an alignment apparatus, and thereafter the light source unit 220 is attached to the probe 91 of the alignment apparatus. At this time, the bonding surface 51A of the supporting member 51 is placed in opposition to the rear surface 801B of the row bar 801. Subsequently, a predetermined voltage is applied between terminal electrodes 511 and 512 of the laser diode 50 to allow a laser beam to be emitted toward the slider 230. As described in FIG. 10, for example, the laser diode 50 has a property in which the light output is increased with increasing the drive current. The drive current lower than a predetermined threshold current Ith leads to the first mode (LED emission state) in which both a TE polarization component and a TM polarization component are outputted. The drive current higher than the predetermined threshold current Ith leads to the second mode (LD oscillation state) in which the TE polarization component is more outputted compared with the TM polarization component in TE polarized LD case. Accordingly, in this case, the controller 94 controls the drive current supplied to the laser diode 50 to be lower than the threshold current Ith, and therefore the LED emission state is achieved. Note that, as illustrated in FIG. 10, in the LD oscillation state, rate of change (gradient) in the light output with respect to the drive current is extremely large compared with in the LED emission state.

Figure 9:
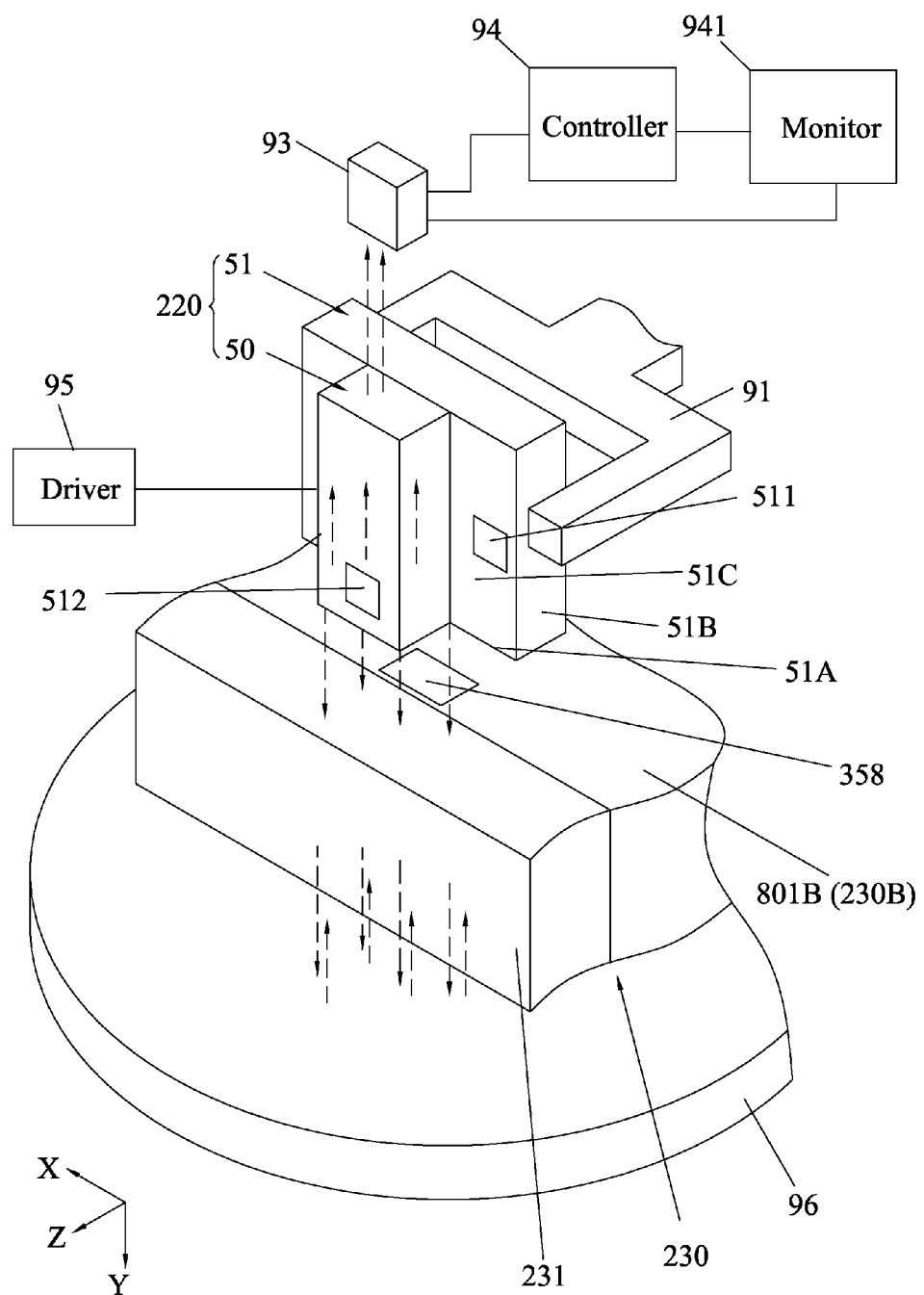
FIG. 9 is a perspective view illustrating a process following the process of FIG. 8, and an alignment apparatus is shown therein.
Figure 10:
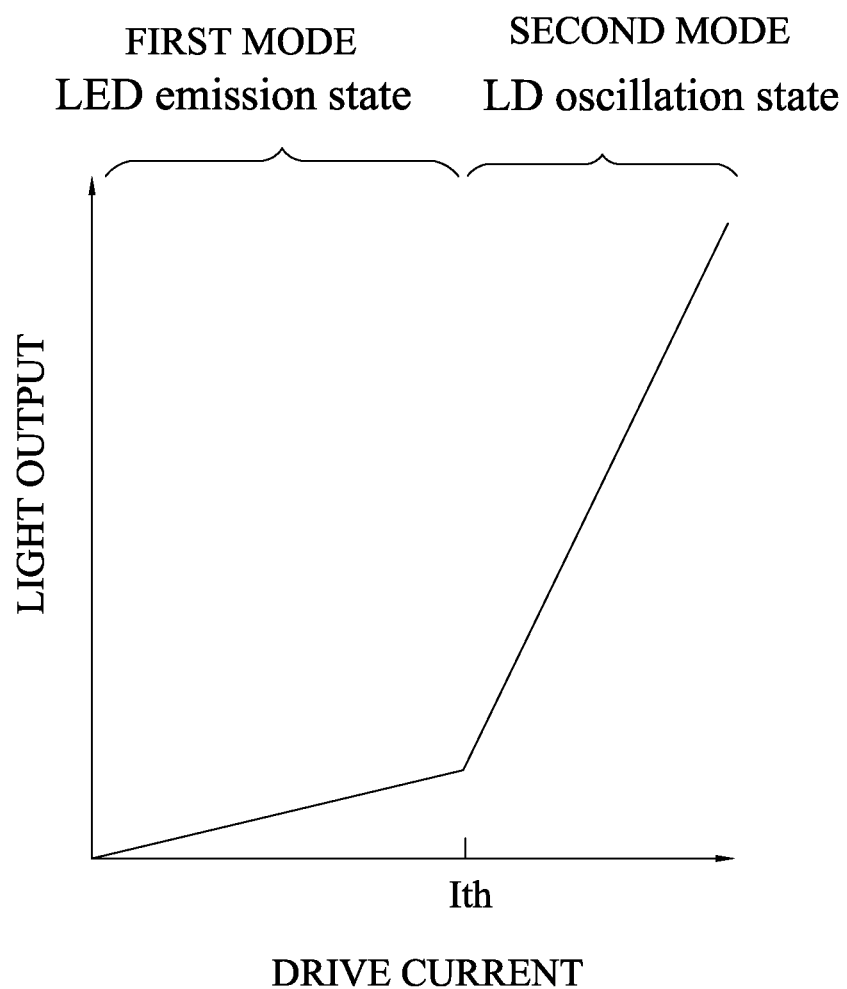
FIG. 10 is a characteristic diagram illustrating a relationship between a drive current and light output of a laser diode.
Figure 11:
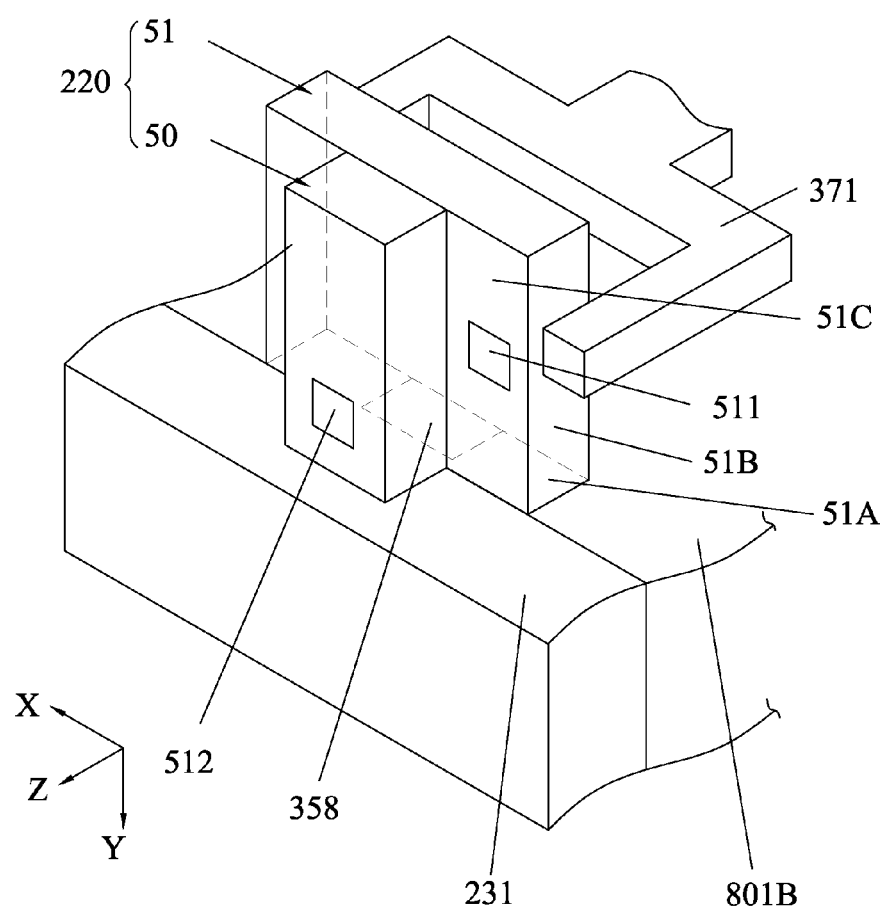
FIG. 11 is a perspective view illustrating a process following the process of FIG. 9, therein the alignment apparatus is not shown.
Figure 12:
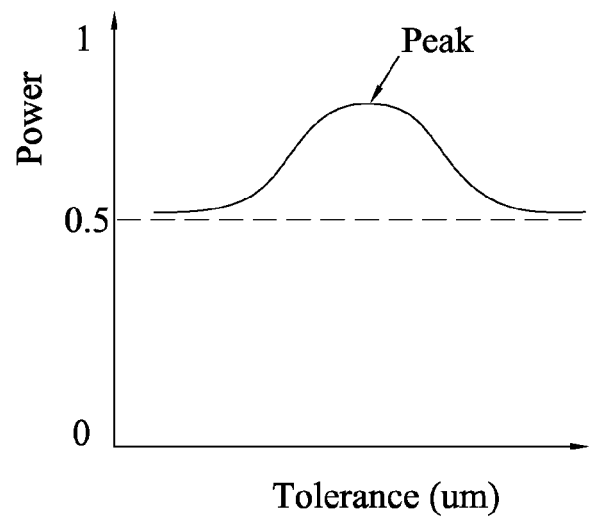
FIG. 12 is a schematic diagram illustrating an output power distribution of a reflected light of the laser diode which is passed through a waveguide of a magnetic write head section in a LED emission state.

Referring to FIGS. 9 to 11, within the contemplation of the present invention, alignment between the light source unit 220 (the laser diode 50) and the magnetic write head section 342 is performed based on the power distribution of the reflected light of the light beam which is reflected by the reflection board 96 and the passed through the waveguide 354, in the LED emission state. Specifically, a drive current lower than the threshold current Ith is applied to the laser diode 50 via the driver 95, LED emission state is obtained and emit a light beam to the slider 230. And a small quantity of light beam is emitted to opposite side of the slider 230. Concretely, the main light beam is passed through the waveguide 354 and then coupled with the plasmon generator 356, and reached the reflection board 96. Subsequently, the light beam is reflected by the reflection board 96 and the passed through the waveguide 354 and transmitted in the laser diode 50, and finally emitted from the back end of the laser diode 50. At this time, the reflected light beam and the original small quantity of light beam emitting will be received and detected by the photo detector 93 set on the back end of the laser diode 50. As a result, a power curve of the reflected light emitted from the back end of the laser diode 50 can be detect, and then the maximum power (peak) will be detected out (referring to FIG. 12). In this condition, the light source unit 220 is controlled to move in the X-axis direction (the direction across tracks) and the Z-axis direction while the laser beam is maintained to be emitted and the photo detector 93 sequentially detects the maximum power of the reflection light reflected by the reflection board 96 and passed through the waveguide 354 and the Plasmon generator 356. With this operation, maximum peak position of the reflection light power detected by the photo detector 93 is allowed to be coincident with the reference position of the magnetic write head section 342. For example, an alignment between the reference position of the tray and the optical axis of the photo detector 93 is performed in advance, and the alignment between the light source unit 220 and the magnetic write head section 342 is performed by moving only the light source unit 220 held by the probe 91. Basically when reflection light couples to LD, light output power from LD become unstable in LD oscillation state. On the other hands, it would not happen in LED emission state, because light coherency of LED is lower than LD and light interference doesn't happen. Since a stable performance of the laser diode 50 can be obtained in the LED emission state, thus the alignment process is performed in this LED emission state can achieve a more stable effect and improve the alignment accuracy therefore.

Figure 13:
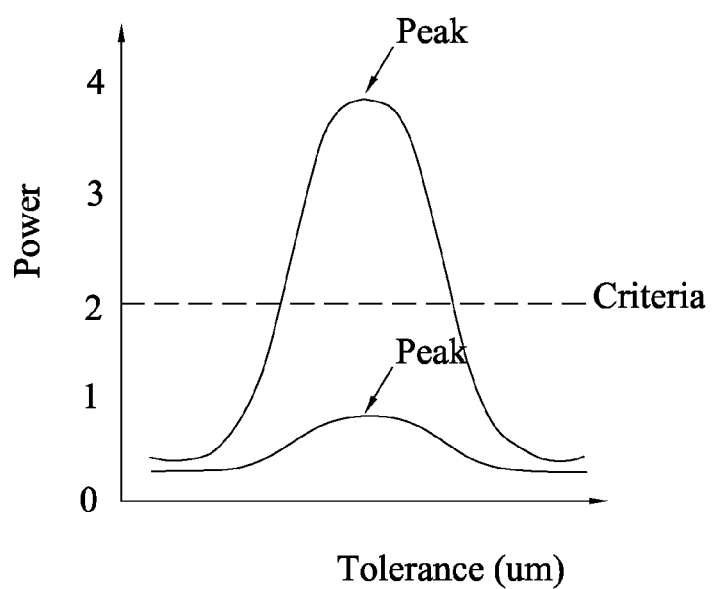
FIG. 13 is a schematic diagram illustrating output power distributions of reflected light of the laser diodes in LED emission state according two compared-samples, thereby showing a good sample and a bad sample.

Concretely, the maximum power is depended on the driven current applied to the laser diode 50, the reflectance of the reflection board 96, the transmission efficiency and reflectance of the plasmon generator 356 and waveguide 354, and the transmission in the laser diode 50. Preferably, the performance of the plasmon generator 356 could be judged by analyzing the maximum power of the reflected light. As shown in FIG. 13, if the maximum power detected out is beyond the criteria, the plasmon generator 356 will be judged to be bad and then the thermally-assisted magnetic head will be abandoned; if the maximum power detected out is below the criterion, the Plasmon generator will be judged to be good which will perform the next process. The judging process can screen out plasmon generator 356 with bad performance, which prevents the bad plasmon generator 356 entering to the next manufacturing process. Accordingly, the alignment apparatus includes a judgment module with such a function.

Thereafter, while the relative position between the light source unit 220 and the magnetic write head section 342 is maintained, the light source unit 220 is moved in the Y-axis direction to come into contact with the slider 230 through the bonding layer 358 as illustrated in FIG. 11. Therefore, the alignment between the light source unit 220 and the bar 801 and the alignment between the light source unit 220 and the slider body 231 are completed.

Subsequently, a bonding process is performed. Commonly, a laser beam, with a predetermined wavelength which passes through the supporting member 51 is applied to the both side surfaces 51B of the supporting member 51. As the laser beam, for example, an Nd-YAG laser beam (λ=1064 nm) may be used. Bonding process between the light source unit 220 and the slider body 231 is well known to persons skilled in the art, thus detailed description is omitted here.

In such a way, the manufacture of the thermally-assisted magnetic head slider 230 is completed.

Figure 14A:
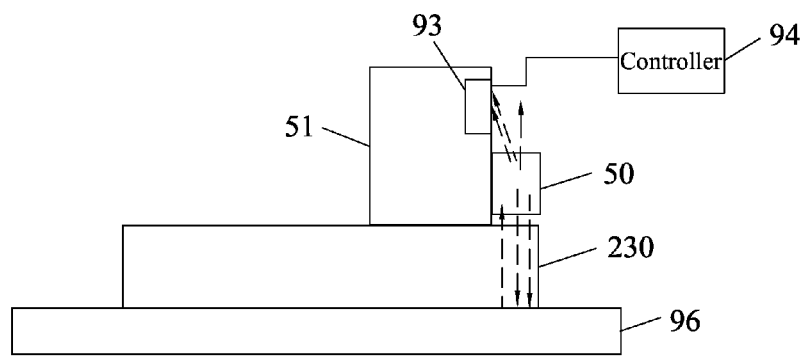
FIGS. 14a~14c are simplified block diagram of partial alignment apparatus, which shows optional configurations of the photo detector.
Figure 14B:
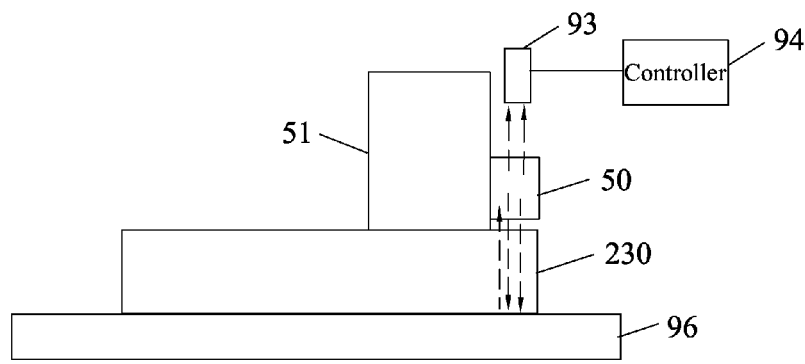
Figure 14C:
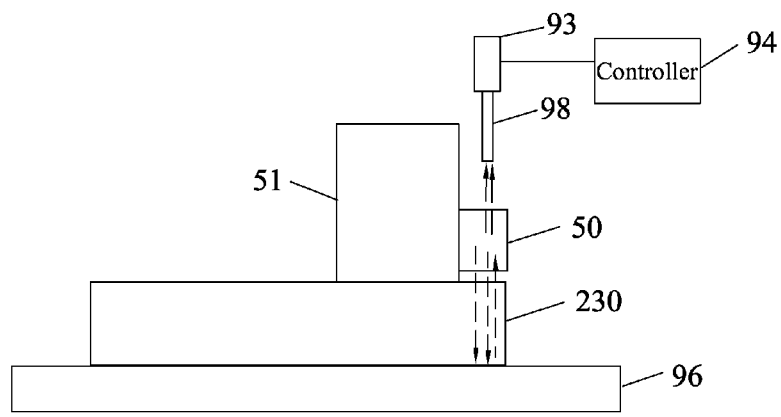

As an optional embodiment, the photo detector 93 is embedded in the supporting member, as shown in a block diagram of FIG. 14a, where the reflected light can be received. Preferably, the photo detector 93 is separated from the supporting member, which is an individual member located at the back end of the laser diode 50, as shown in FIG. 14b. Optionally, the method or the apparatus further configures a lens fiber 98 at the back of the laser diode 50 which is connected with the photo detector 93, as shown in a block diagram of FIG. 14c.

In this embodiment, a disk 96 is served as the reflection board 96, which is convenient to the manufacturing method. Of course, any other suitable reflectors also can be used, only if their reflectivity is the same with that of the disk.

In conclusion, the manufacturing method of the present invention provides a reflection board 96 at the front of the laser diode 50 and the slider 220, and a photo detector 93 at the back of the laser diode 50, and drives the laser diode 50 to emit a light beam towards the reflection board, and performing the alignment process, based on a reflected light of the light beam reflected by the reflection board, then passed through the waveguide 354 and finally detected by the photo detector 93 obtaining the maximum power in the LED emission state of the laser diode 50. Since a stable performance of the laser diode 50 can be obtained in the LED emission state, thus the alignment process is performed in this LED emission state can achieve a more stable effect and improve the alignment accuracy therefore.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method of manufacturing a thermally-assisted magnetic head, the method comprising:
   providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide;
   providing a light source unit including a laser diode, the light source unit being attached at a surface of the slider which is opposite the air bearing surface;
   providing a reflection board positioned at the side of the air bearing surface of the slider, and a photo detector positioned at the side of the slider which is opposite the air bearing surface and located above the laser diode;
   driving the laser diode to emit a light beam towards the reflection board;
   performing an alignment between the light source unit and the thermally-assisted magnetic recording head section, based on a reflected light of the light beam reflected by the reflection board, then passed through the optical waveguide and finally detected by the photo detector obtaining the maximum power in a LED emission state of the laser diode; and
   bonding the light source unit to the slider after the alignment is completed,
   wherein the reflection board is a disk or a reflector that has the same reflectivity of the disk.

2. The method according to claim 1, wherein after the alignment is completed further comprises judging performance of the plasmon generator by analyzing the maximum power of the reflected light.

3. The method according to claim 1, wherein the photo detector is embedded in a supporting member of the light source unit.

4. The method according to claim 1, wherein the photo detector is separated from a supporting member of the light source unit.

5. The method according to claim 4, further comprising providing a lens fiber at the back of the laser diode and connected with the photo detector.

6. An alignment apparatus allowing a light source unit including a laser diode to be aligned with a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide, the light source unit being attached at a surface of the slider which is opposite the air bearing surface, the alignment apparatus comprising:
   a reflection board positioned at the side of the air bearing surface of the slider;

a driver driving the laser diode to emit a light beam towards the reflection board;

a photo detector positioned at the side of the slider which is opposite the air bearing surface and located above the laser diode, for detecting a power of a reflected light of the light beam reflected by the reflection board; and a controller controlling a relative-position relationship between the light source unit and the slider, based on the reflected light obtaining the maximum power in a LED emission state of the laser diode, wherein the reflection board is a disk or a reflector that has the same reflectivity of the disk.

7. The alignment apparatus according to claim 6, further comprising a judgment module for judging performance of the plasmon generator by analyzing the maximum power of the reflected light.

8. The alignment apparatus according to claim 6, wherein the photo detector is embedded in a supporting member of the light source unit where the reflected light could be received.

9. The alignment apparatus according to claim 6, wherein the photo detector is separated from a supporting member of the light source unit.

10. The alignment apparatus according to claim 9, further comprising a lens fiber at the back of the laser diode and connected with the photo detector.

* * * * *